US008958972B1

(12) United States Patent
Fisher

(10) Patent No.: US 8,958,972 B1
(45) Date of Patent: Feb. 17, 2015

(54) METHOD AND SYSTEMS FOR STORING FUEL FOR REDUCED USAGE

(71) Applicant: General Electric Company, Schenectady, NY (US)

(72) Inventor: Kevin Michael Fisher, North East, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/974,316

(22) Filed: Aug. 23, 2013

(51) Int. Cl.
*F17C 7/04* (2006.01)
*B60K 15/00* (2006.01)
*B61C 5/00* (2006.01)
*B61C 17/12* (2006.01)
*B61C 17/02* (2006.01)

(52) U.S. Cl.
CPC ................ *B61C 17/12* (2013.01); *B61C 17/02* (2013.01)
USPC .......................................... 701/103; 701/22

(58) Field of Classification Search
USPC ......................................................... 105/1.4
See application file for complete search history.

(56) References Cited

U.S. PATENT DOCUMENTS

| | | | | |
|---|---|---|---|---|
| 4,550,701 A | * | 11/1985 | Suzuki et al. | 123/436 |
| 5,588,416 A | * | 12/1996 | Suzuki et al. | 123/684 |
| 5,678,402 A | * | 10/1997 | Kitagawa et al. | 60/276 |
| 7,168,411 B2 | * | 1/2007 | Bourn et al. | 123/396 |
| 2008/0027639 A1 | * | 1/2008 | Tryon | 701/209 |
| 2008/0202376 A1 | * | 8/2008 | Meltser et al. | 105/26.05 |
| 2008/0226463 A1 | * | 9/2008 | Batenburg et al. | 417/32 |
| 2009/0056686 A1 | * | 3/2009 | Suzuki | 123/703 |
| 2009/0186325 A1 | * | 7/2009 | Kumar | 434/219 |
| 2011/0253113 A1 | * | 10/2011 | Roth et al. | 123/568.12 |
| 2011/0257869 A1 | * | 10/2011 | Kumar et al. | 701/103 |
| 2011/0314839 A1 | * | 12/2011 | Brook et al. | 62/49.1 |
| 2012/0085260 A1 | | 4/2012 | Nichini et al. | |
| 2012/0090729 A1 | | 4/2012 | Nichini et al. | |
| 2012/0310456 A1 | * | 12/2012 | Mischler et al. | 701/22 |
| 2013/0284123 A1 | * | 10/2013 | Foege | 123/2 |
| 2013/0340715 A1 | * | 12/2013 | Pursifull | 123/464 |
| 2014/0033738 A1 | * | 2/2014 | Billig et al. | 62/48.1 |
| 2014/0033941 A1 | * | 2/2014 | Foege et al. | 105/1.4 |
| 2014/0033944 A1 | * | 2/2014 | Foege | 105/1.4 |
| 2014/0076283 A1 | * | 3/2014 | Pursifull | 123/458 |

FOREIGN PATENT DOCUMENTS

| | | | | |
|---|---|---|---|---|
| JP | 06249072 A | * | 9/1994 | F02M 7/12 |
| WO | WO 2013/091109 A1 | * | 6/2013 | B61C 5/00 |

OTHER PUBLICATIONS

Machine Translation of JP 06249072 A.*

* cited by examiner

*Primary Examiner* — John R Olszewski
*Assistant Examiner* — Navid Ziaeianmehdizadeh
(74) *Attorney, Agent, or Firm* — GE Global Patent Operation; John A. Kramer

(57) ABSTRACT

Various methods and systems are provided for initiating and executing a fuel routine for a vehicle. In one embodiment, a method comprises sending from a controller of a vehicle a fuel request to a fuel tender to reduce a pressure of gaseous fuel on the fuel tender and adjusting one or more vehicle operating parameters to allow consumption of the gaseous fuel at an engine of the vehicle when the pressure of the gaseous fuel is below a threshold supply pressure.

21 Claims, 4 Drawing Sheets

METHOD AND SYSTEMS FOR STORING FUEL FOR REDUCED USAGE

FIELD

Embodiments of the subject matter disclosed herein relate to rail vehicles. Other embodiments relate to rail vehicles with fuel tenders.

BACKGROUND

Locomotives (or other vehicles) typically include a prime mover that is powered by a fuel source to generate mechanical energy. In one example of a locomotive, mechanical energy generated by the prime mover may be converted to electrical energy that is used to power traction motors and other components and systems of the locomotive. In some examples, the prime mover may be a combustion engine that is fueled by diesel, gasoline, or other liquid petroleum distillates. In other examples the engine may additionally or alternatively utilize a gaseous fuel, such as natural gas.

In light of its favorable energy content, liquefied natural gas (LNG) may be used as a fuel source for a locomotive prime mover. Particularly for long-haul applications, it may also be desirable to utilize a fuel tender for carrying one or more LNG storage tanks. The fuel tender may be coupled to the locomotive prime mover. Prior to injection into a locomotive's natural gas-fueled engine, LNG is typically vaporized into gaseous natural gas (CNG).

In one example, when LNG is stored in an unrefrigerated tank, the LNG storage tank gradually heats up due to tank insulation not being 100% efficient. Even with efficient insulation and cryogenic refrigeration equipment, heat may leak into the LNG storage tank. Additionally, over time, the LNG tank pressure builds to a safety relief pressure threshold, thereby causing a pressure relief valve to open. Opening of the pressure relief valve vents the LNG storage tank and reduces the LNG tank pressure. However, venting the LNG storage tank may waste fuel while also presenting a safety risk, including adding pollutants to the environment.

In some examples, the LNG storage tank system may include an economizer for controlling a pressure within the LNG storage tank. Specifically, when the LNG storage tank pressure increases above a threshold pressure, vapor within the LNG tank may be preferentially routed to a vaporizer in order to utilize the higher pressure gas. However, this system does not allow the LNG tank pressure to be reduced below the threshold pressure for periods of inactive use.

BRIEF DESCRIPTION

In one embodiment, a method comprises sending from a controller of a vehicle a fuel request to a fuel tender to reduce a pressure of gaseous fuel on the fuel tender and adjusting one or more vehicle operating parameters to allow consumption of the gaseous fuel at an engine of the vehicle when the pressure of the gaseous fuel is below a threshold supply pressure.

In one example, the fuel request may be generated when the vehicle is within a threshold distance of a stopping location. In this way, the gaseous fuel remaining in the gaseous fuel system may be consumed by an engine of the vehicle before the vehicle enters an inactive state. As a result, pressures in the gaseous fuel system and fuel storage tank may be reduced without requiring venting of the tank. Thus, the method may reduce pollutants released into the environment while also increasing fuel economy of the vehicle.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

Figure 3:
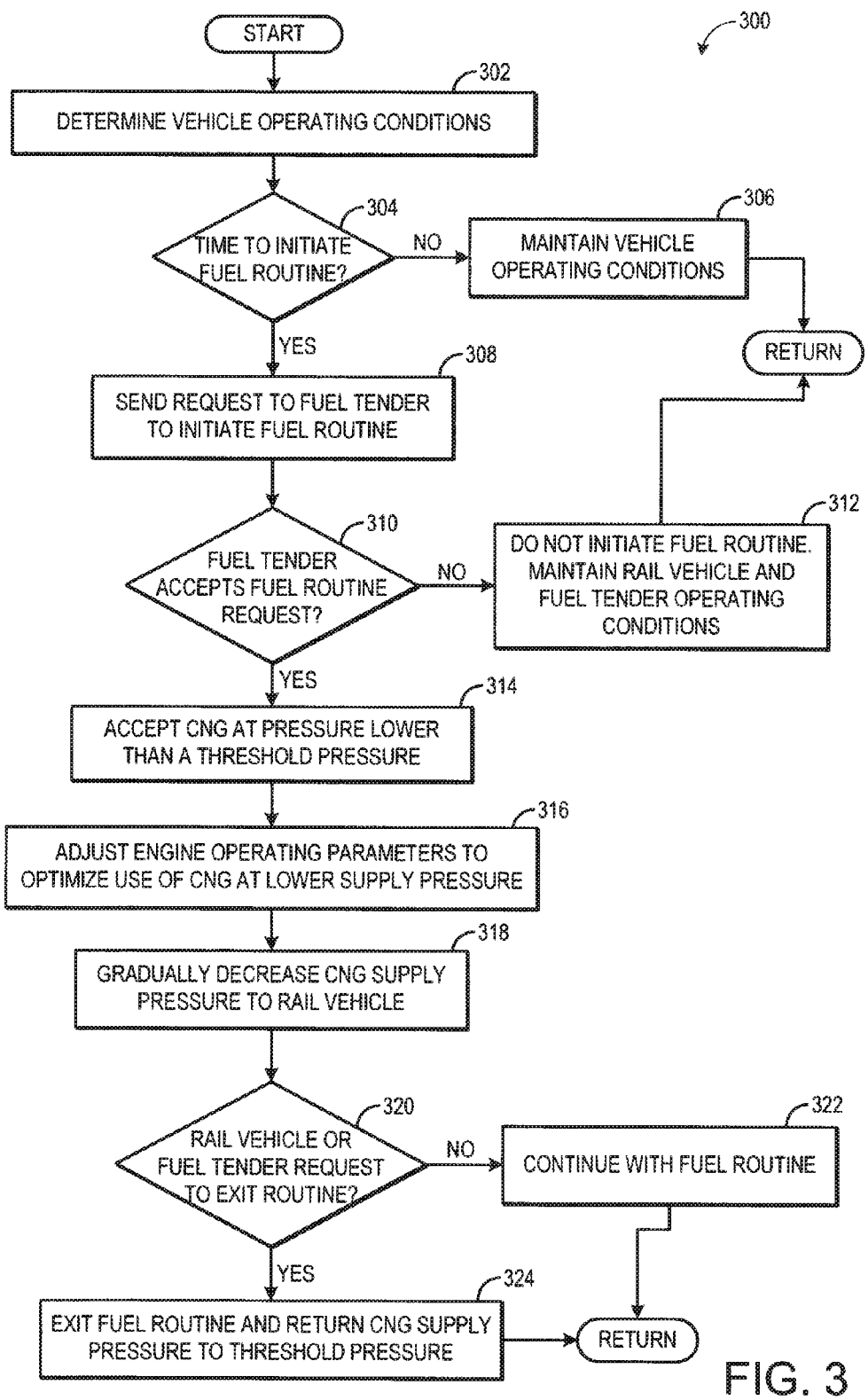
FIG. 3 shows a flow chart of a method for initiating a fuel routine for a gaseous fuel system according to an embodiment of the invention.
Figure 4:
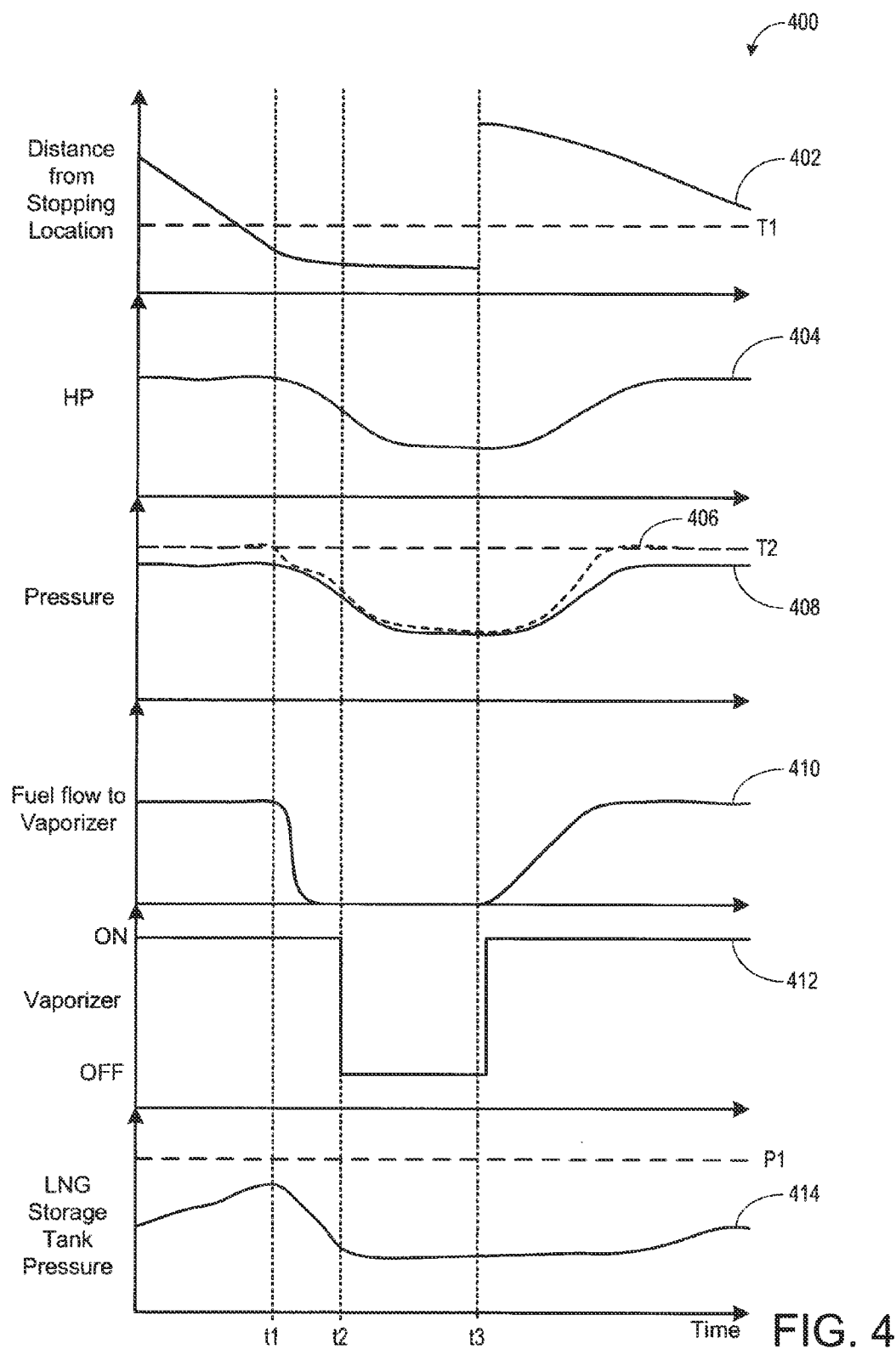
FIG. 4 shows a graphical example of a fuel routine for a gaseous fuel system according to an embodiment of the invention.
Figure 5:
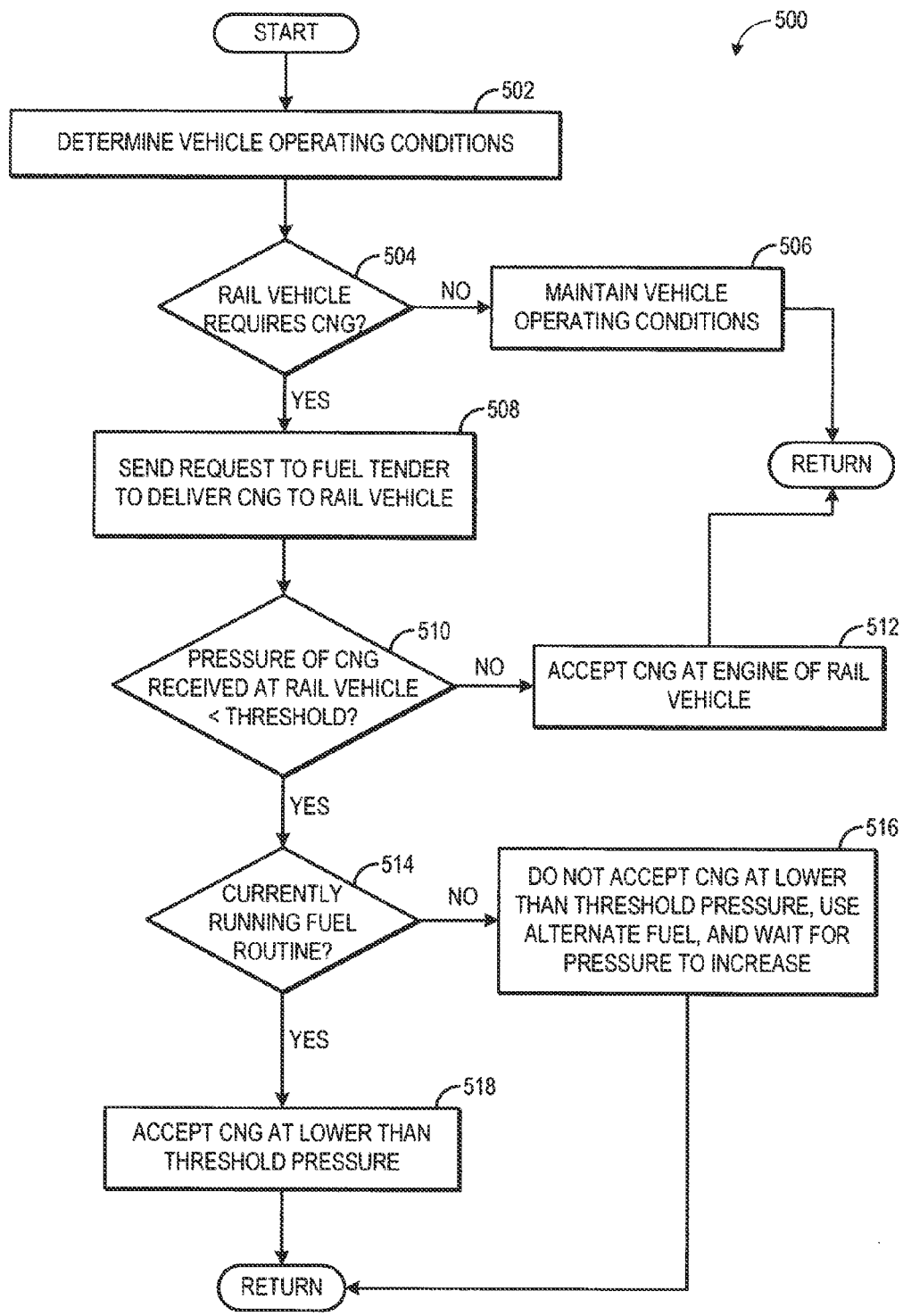
FIG. 5 shows a flow chart of a method for consuming gaseous natural gas at an engine of the rail vehicle according to an embodiment of the invention.

The following description relates to various embodiments of a fuel routine for reducing a pressure of gaseous fuel in a gaseous fuel system. Specifically, in response to one or more vehicle operating conditions, an engine of the vehicle may consume remaining gaseous fuel in the gaseous fuel system before the engine and/or vehicle enters a state of reduced activity (or no activity). As a resulting of consuming the gaseous fuel, pressures in the gaseous fuel system and a fuel storage tank coupled to the gaseous fuel system may be reduced without requiring venting of the fuel storage tank. Pressures in the gaseous fuel system may be further reduced by reducing a rate of converting liquid fuel to gaseous fuel. In one example, the one or more vehicle operating conditions includes the vehicle being within a threshold distance of a determined location. The determined location may be a location at which less gaseous fuel is required such as a location in which the vehicle may stop and an engine of the vehicle may be shut down. In another example, the one or more vehicle operating conditions may be a pressure in the fuel storage tank. In one example, the vehicle may be a rail vehicle coupled to a fuel tender, such as the rail vehicle and fuel tender shown in FIGS. 1-2. Further, in this example, the fuel may be natural gas and liquid natural gas may be stored in a liquid fuel container (e.g., storage tank) on the fuel tender. A vaporizer on the fuel tender may then convert the liquid natural gas (LNG) to gaseous, compressed natural gas (CNG) and then send the CNG to the engine of the rail vehicle for consumption. A method for reducing the pressure of CNG in the natural gas fuel system (e.g., CNG in fuel supply lines and pressure in the LNG storage tank) in response to one or more vehicle operating conditions is presented at FIG. 3. Additionally, FIG. 3 shows controlling a manifold pressure (MAP) of the engine of the rail vehicle responsive to the reduced rate of conversion of liquid fuel to gaseous fuel. FIG. 5 shows a method for consuming the CNG at the engine of the rail vehicle based on a supply pressure of the CNG. Additionally, FIG. 4 shows example adjustments to vehicle horsepower and vaporizer operation responsive to vehicle operating conditions, the vehicle operating conditions including a distance from a stopping location of the vehicle, MAP, and a pressure of the gaseous fuel being sent to the engine. In this way, the controller of the vehicle may reduce the CNG supply pressure to the engine by reducing the conversion of liquid fuel to gaseous fuel during reduced vehicle activity (e.g., stopping) or conditions wherein the pressure in the LNG fuel container approaches an upper threshold pressure. Further, consuming the gaseous fuel from the fuel supply system in this way may reduce a pressure and heat load of the fuel container, thereby reducing venting of the fuel container. Reducing venting of the fuel container may subsequently reduce the amount of pollutants released into the environment while also conserving fuel.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Figure 1:
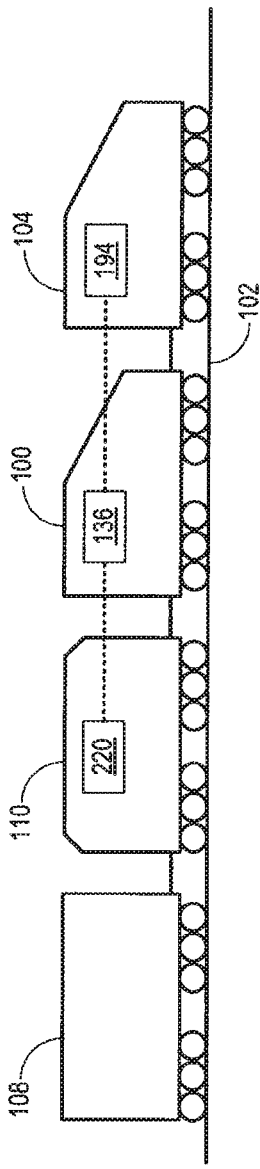
FIG. 1 shows a schematic diagram of two locomotives, a fuel tender, and a freight car according to an embodiment of the invention.

Before further discussion of the approach for controlling a rate of conversion of liquid fuel to gaseous fuel, an example of a rail vehicle including one or more fuel tenders is disclosed. For example, FIG. 1 shows a schematic diagram of a consist of vehicles including a first locomotive 100, a second locomotive 104, a fuel tender 110, and a freight car 108. Specifically, FIG. 1 shows the first locomotive 100 removably coupled to the second locomotive 104 and removably coupled to the fuel tender 110 according to the present disclosure. The fuel tender 110 is shown removably coupled to a freight car 108. It will be appreciated that additional fuel tenders, freight cars, locomotives, and/or other railroad vehicles may also be removably connected to the freight car 108 and/or the second locomotive 104. It will also be appreciated that the order of the various railroad vehicles shown in FIG. 1 may be modified. For example, FIG. 1 shows the second locomotive 104 as the lead vehicle of the consist and the freight car 108 as the trail vehicle. However, in other embodiments the first locomotive 100 may be the trail vehicle.

The first locomotive 100, the second locomotive 104, the fuel tender 110, and the freight car 108 are configured to run on a rail 102 (or set of rails) via a plurality of wheels. In FIG. 1, the fuel tender 110 is positioned behind the first locomotive 100 and removably connected to the freight car 108. In other configurations, the fuel tender 110 may be positioned in front of the locomotive 100 and/or may not be connected to the freight car 108 or other rail car. In still other configurations, one or more other rail cars may be located between the fuel tender 110 and the locomotive 100.

In one example the first locomotive 100 and second locomotive 104 are powered for propulsion, while the fuel tender 110 and freight car 108 are non-powered. It will be appreciated that in other examples one or more of the fuel tender 110 and freight car 108 may also be powered for propulsion by, for example, one or more traction motors.

Additionally, FIG. 1 shows a tender controller 220 on board the fuel tender 110, a first locomotive controller 136 on board the first locomotive, and a second locomotive controller 194 on board the second locomotive. As described further below, the first locomotive controller 136 controls operation of the primary engine 118 and the tender controller 220 controls operation of the fuel tender 110. However, the first locomotive controller 136 may send signals and/or requests (e.g., commands) to the tender controller 220 regarding operation of the fuel tender 110. For example, the first locomotive controller 136 may send a request to the tender controller 220 of the fuel tender 110 to convert liquid natural gas to gaseous natural gas and send the gaseous natural gas via one or more fuel lines to an engine of the first locomotive 100, as described further below. Further, the first locomotive controller 136 may include instructions stored thereon (e.g., within a memory of the controller) for sending a plurality of requests to the tender controller 220 and to components on board the fuel tender 110. The tender controller 220 may then control actuators and/or components on board the fuel tender 110 based on the requests sent from the first locomotive controller 136 on board the first locomotive 100. As shown in FIG. 1, the tender controller 220, first locomotive controller 136, and second locomotive controller 194 all communicate electronically with one another.

Figure 2:
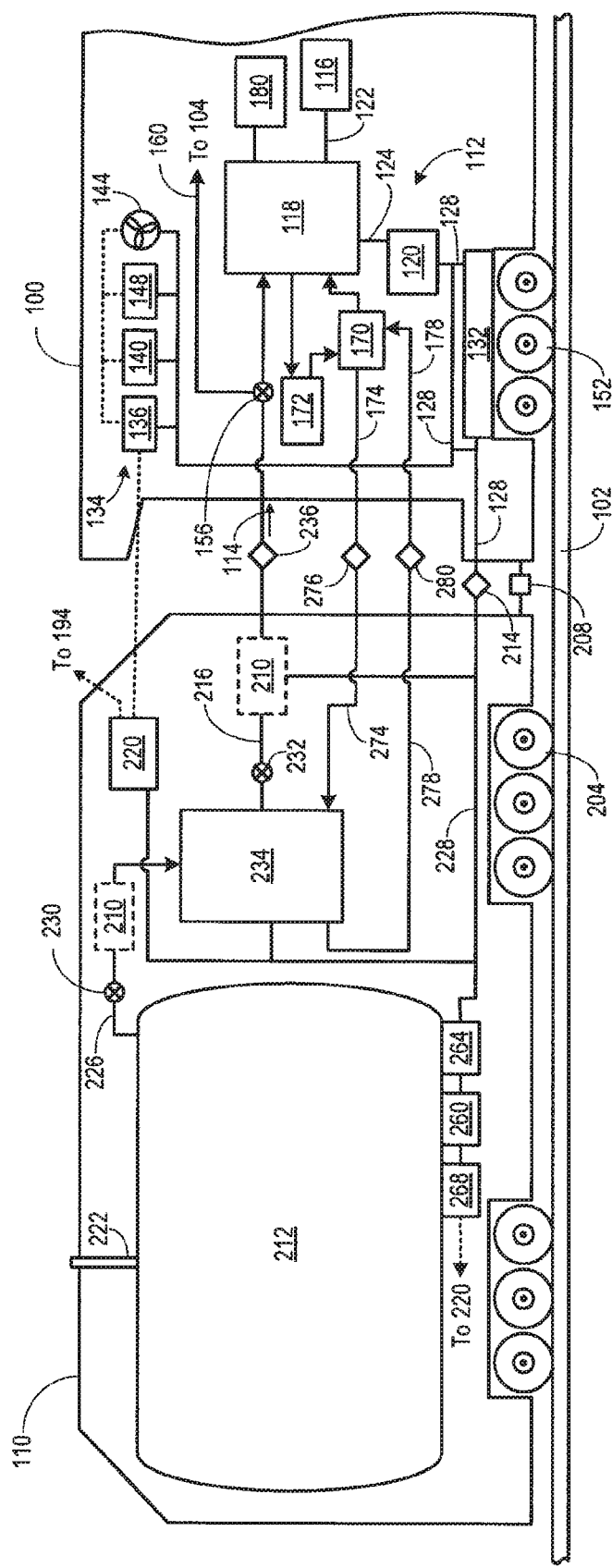
FIG. 2 shows a schematic diagram of an example fuel tender and natural gas-fueled locomotive according to an embodiment of the invention.

Turning now to FIG. 2, the first locomotive 100 includes an engine system 112 that comprises a primary engine 118 having a plurality of cylinders. The primary engine 118 may be referred to herein as the locomotive engine. In one embodiment, each cylinder is configured to have at least one gaseous fuel injector and at least one liquid fuel injector. In the depicted example, first locomotive 100 is configured as a locomotive powered by engine system 112 that operates with various fuels, such as a first fuel and a second fuel. The fuels may include a liquid fuel, such as diesel fuel, an alternative fuel, and/or a gaseous fuel, or combinations thereof. In one example, the primary engine 118 is a dual fuel engine, such as a gas turbine, compression ignition engine, or spark ignition engine, a first fuel is gaseous natural gas that is received from the fuel tender 110 via a gaseous natural gas (CNG) fluidic coupling 114 (e.g., fuel line), and a second fuel is diesel fuel received from a diesel storage tank 116 via a fluidic coupling 122 on board the first locomotive 100. While engine system 112 is configured in one embodiment herein as a multi-fuel engine operating with diesel fuel and natural gas, in other examples engine system 112 may use various combinations of fuels other than diesel and natural gas.

The primary engine 118 is coupled to a turbocharger 180. The turbocharger 180 may be arranged between an intake passage to the primary engine 118 and an exhaust passage from the primary engine 118. The turbocharger 180 increases air charge of ambient air drawn into the intake passage in order to provide greater charge density during combustion to increase power output and/or engine-operating efficiency. The turbocharger 180 may include a compressor (not shown) which is at least partially driven by a turbine (not shown). In some examples, the compressor may include a compressor recirculation valve (CRV) operable by the locomotive controller 136 and configured to recirculate intake air around the compressor. Additionally, the turbine may include a waste gate operable by the locomotive controller and configured to divert exhaust gases around the turbine. As such, opening the CRV and/or the waste gate may reduce boost and torque output of the primary engine 118.

The primary engine 118 is configured to generate a torque that is transmitted to a power conversion unit 120 along a drive shaft 124. The power conversion unit 120 is configured to convert the torque into electrical energy that is delivered via electrical bus 128 to at least one traction motor 132 and to a variety of downstream electrical components in the first locomotive 100. Such components may include, but are not limited to, compressors 140, blowers 144, batteries 148, an electronics control system 134 comprising one or more controllers 136, shutoff valves, pressure regulators, radiators, lights, on-board monitoring systems, displays, climate controls (not shown), and the like. The electrical bus 128 further delivers electrical energy to the fuel tender 110.

Based on the nature of the generated electrical output, the electrical bus 128 may be a direct current (DC) bus (as depicted) or an alternating current (AC) bus. In one example the power conversion unit 120 includes an alternator (not shown) that is connected in series to one or more rectifiers (not shown) that convert the alternator's electrical output to DC electrical power prior to transmission along the electrical bus 128. The alternator may include, for example, a high-speed generator, a generator machine whose stator flux is synchronous to the rotor flux, or an asynchronous machine.

Based on the configuration of a downstream electrical component receiving power from the electrical bus 128, one or more inverters may be configured to invert the electrical power from the electrical bus prior to supplying electrical power to the downstream component. In one example, a single inverter may supply AC electrical power from a DC electrical bus to a plurality of components. In another non-limiting embodiment, each of a plurality of distinct inverters may supply electrical power to a distinct component.

The traction motor 132 receives electrical power from the power conversion unit 120 and is coupled to one or more axles/driving wheels 152. In this manner, the traction motor 132 is configured to drive the axles/driving wheels 152 along the rail 102. It should be appreciated that the number of sets of axles/driving wheels 152 may vary, and that one or more traction motors 132 may be provided for each set of axles/driving wheels. The traction motor 132 may be an AC motor. Accordingly, an inverter paired with the traction motor 132 may convert DC input to an appropriate AC input, such as a three-phase AC input, for subsequent use by the traction motor. In other non-limiting embodiments, traction motor 132 may be a DC motor directly employing the output of the power conversion unit 120 after rectification and transmission along the DC bus 128.

One example locomotive configuration includes one inverter/traction motor 132 pair per axle/driving wheel 152. Traction motor 132 may also be configured to act as a generator providing dynamic braking to brake the first locomotive 100. In particular, during dynamic braking, the traction motor may provide torque in a direction that is opposite from the rolling direction, thereby generating electricity that is dissipated as heat by resistors (not shown) connected to the electrical bus 128.

The first locomotive controller 136 on board the first locomotive 100 controls the primary engine 118 by sending commands to various engine control hardware components such as invertors, alternators, relays, fuel injectors, fuel pumps (not shown), or the like. As described further below, in one example, the first locomotive controller 136 also monitors locomotive operating parameters in active operation, idle, and shutdown states. Such parameters may include, but are not limited to, manifold air temperature (MAT), ambient temperature, engine oil temperature, compressor air pressure, main air reserve pressure, battery voltage, a battery state of charge, brake cylinder pressure, or the like. The first locomotive controller 136 further includes computer readable storage media (not shown) including code for enabling on-board monitoring and control of rail vehicle operation.

The first locomotive controller 136, while overseeing control and management of the primary engine 118 and other locomotive components, may be configured to receive signals from a variety of engine sensors, as further described herein. The first locomotive controller 136 may utilize such signals to determine operating parameters and operating conditions, and correspondingly adjust various engine actuators to control operation of the first locomotive 100. For example, the first locomotive controller 136 may receive signals from various engine sensors including, but not limited to, engine speed, engine load, boost pressure, exhaust pressure, ambient pressure, exhaust temperature, manifold pressure (MAP), or the like. Correspondingly, the first locomotive controller 136 may control the locomotive 100 by sending commands to various components such as traction motors, alternators, cylinder valves, throttles, or the like. As described further below, the first locomotive controller 136 at least partially controls operation of the fuel tender by sending commands (e.g., requests) to the tender controller 220 on board the fuel tender. For example, the commands sent to the tender controller 220 may include commands to initiate various fuel routines and/or commands for controlling various components on board the fuel tender such as a vaporizer 234, a pump 210, a LNG storage tank 212, or the like. In one example, the commands for controlling various components on board the fuel tender may be indirect commands based on fuel routine requests sent to the fuel tender. In some examples, the vaporizer 234 may be referred to as a regasification unit. For purposes of this description, an "on-board" component, device or other structure means that the component or device is physically located on the vehicle being described. For example, with respect to the fuel tender 110, a component or structure physically located on the fuel tender is on board the fuel tender, including when the fuel tender is coupled to a locomotive or other rail vehicle and when the fuel tender is not coupled to a locomotive or other rail vehicle.

In one example, the computer readable storage media configured in the first locomotive controller 136 may execute code to auto-stop or auto-start the primary engine 118 by enabling, for example, an Automatic Engine Start/Stop (AESS) control system routine. As discussed in more detail below, the first locomotive controller 136 also communicates with the tender controller 220 on board the fuel tender 110 to, for example, request delivery of gaseous natural gas for the primary engine 118. As shown in FIGS. 1-2, the first locomotive controller 136 also communicates with the second locomotive controller 194 in the second locomotive 104 to, for example, coordinate pass-through delivery of gaseous natural gas from the fuel tender 110 to a natural-gas fueled engine in the second locomotive 104. The computer readable storage media configured in the first locomotive controller 136 may execute code to appropriately transmit and receive such communications.

With continued reference to FIG. 2, the fuel tender 110 is removably coupled to the first locomotive 100 and includes axles/wheels 204 configured to travel along rail 102. In the depicted example, the fuel tender 110 includes six pairs of axles/wheels 204. In another embodiment, the fuel tender 110 may include four axles and four pairs of wheels (e.g., eight wheels in total). The fuel tender 110 further includes a mechanical coupling mechanism 208 that removably couples the fuel tender to the first locomotive 100 for linked movement thereof. In other examples, the fuel tender 110 may include a second coupling mechanism (not shown) that may removably couple the fuel tender to another rail vehicle, such as the freight car 108 or to another locomotive.

The fuel tender 110 is configured to carry one or more fuel storage tanks. In one embodiment, as shown in FIG. 2, the fuel tender 110 includes an on-board cryogenic LNG storage tank 212 for storing LNG. The LNG storage tank 212 is a fuel container wherein the fuel stored in the fuel container is LNG. In one example, the LNG storage tank 212 may take the form of a vacuum-jacketed pressure vessel that stores LNG at pressures ranging from approximately 690 kPa to approximately 900 kPa. It will be appreciated that to maintain LNG in a liquid state, the LNG may be stored at a temperature range of approximately 4-80 degrees Celsius. In some examples, as shown in FIG. 2, the fuel tender 110 includes a cryogenic unit 268 for helping maintain the LNG within desired temperature and pressure ranges. In other example, the fuel tender 110 may not include the cryogenic unit 268.

Even with efficient insulation and cryogenic refrigeration equipment, heat may leak into the LNG storage tank 212 and cause vaporization of portions of the LNG into boil-off gas. As discussed above, the LNG storage tank 212 may include a first portion filled with LNG. The remaining portion of the LNG storage tank 212 may contain CNG. As such, the remaining portion of the LNG storage tank 212 not containing LNG may be referred to herein as the vapor space of the LNG storage tank. The CNG in the LNG tank vapor space may cause the pressure in the LNG storage tank to increase over time. As discussed further below, this may result in opening of a pressure relief valve.

It will also be appreciated that the LNG storage tank 212 may have various sizes and configurations and may be removable from the fuel tender 110. Further, as shown in FIG. 2, the storage tank 212 is configured to receive LNG from an external refueling station via port 222. In alternate examples, the storage tank 212 may receive LNG through another port or location on the storage tank 212.

The LNG storage tank 212 supplies LNG via cryogenic LNG fluidic coupling 226 and one or more valves 230 to a vaporizer 234. The vaporizer 234 converts the LNG into gaseous or compressed natural gas (CNG), or vaporizes the LNG, by the application of heat to the LNG. Specifically, the vaporizer 234 vaporizes the LNG to CNG by utilizing heated fluid supplied to the vaporizer 234. In some examples, the vaporizer 234 includes a pump, motor, and valve, all of which may be controlled by the locomotive controller 136 and/or the tender controller 220. As shown in FIG. 2, heated fluid for the conversion of LNG to CNG is generated by a heat exchanger 170 positioned on the first locomotive 100. The heat exchanger 170 receives engine cooling water from a radiator 172. Engine cooling water from the primary engine 118 flows to the radiator 172 to be cooled and then sent back to the primary engine 118. Before the cooled engine cooling water flows back to the primary engine 118, the cooled engine cooling water passes through the heat exchanger 170 to heat a secondary fluid, or coolant. The coolant heated at the heat exchanger 170 then flows from the heat exchanger to the vaporizer 234 on the fuel tender 110 via heated coolant line 174 and heated coolant line 274. The heated coolant line 174 and the heated coolant line 274 are coupled together at a detachable interface coupling 276 that enables the fuel tender 110 to be decoupled from the first locomotive 100. Coolant then returns to the heat exchanger 170 via coolant line 278 and coolant line 178. The coolant line 278 and the coolant line 178 are coupled together at a detachable interface coupling 280 that enables the fuel tender 110 to be decoupled from the first locomotive 100. In alternate embodiments, heat may be supplied to the vaporizer 234 from an alternative source on board the first locomotive 100, another locomotive or other rail vehicle, and/or fuel tender. Further, additional and/or alternative liquid or gas sources may be used to provide heat to the vaporizer 234.

The CNG is then delivered to the primary engine 118 of the first locomotive 100 via supply lines to power the primary engine 118. As shown in FIG. 2, the CNG is delivered to the primary engine 118 via CNG fluidic coupling 216 and CNG fluidic coupling 114 and one or more control valves 232. Thus, the CNG fluidic coupling 216 and the CNG fluidic coupling 114 may be referred to herein as the supply lines. In some examples, as shown in FIG. 2, a pass-through control valve 156 is provided to direct at least a portion of the CNG through the first locomotive 100 via a pass through fluidic coupling 160 to the second locomotive 104. In this manner, a natural gas-fueled engine in the second locomotive 104 may be powered by gaseous natural gas from the fuel tender 110. In alternate examples, there may not be a control valve 156 and CNG may only be delivered to the first locomotive 100. In yet another example, additional control valves may be positioned in the CNG fluidic coupling 114 to direct CNG to additional locomotives or rail cars.

In a first embodiment, the LNG storage tank 212 may be a higher pressure LNG storage tank wherein the LNG is maintained at a pressure greater than a threshold supply pressure. In one example, the threshold supply pressure of CNG may be approximately 827 kPa. The pressure within the LNG storage tank 212 may then be maintained above 827 kPa (e.g., 1,100 kPa) so the CNG arriving at the first locomotive 100 is at the threshold supply pressure. In other examples, the threshold supply pressure of CNG may be greater or less than 827 kPa and the LNG storage tank pressure may be maintained at a level greater than the threshold supply pressure to account for any pressure losses in the CNG supply system. In this first embodiment, LNG is metered from the storage tank 212 and to the vaporizer 234 by the valve 230, or other metering device. CNG converted from the LNG at the vaporizer 234 then flows to the first locomotive 100 via the CNG fluidic coupling 114. The flow of CNG to the first locomotive is controlled or metered via the valve 232.

In a second embodiment, the LNG storage tank 212 may be a lower pressure LNG storage tank wherein the LNG is maintained at a pressure lower than the threshold supply pressure (e.g., less than 827 kPa). In this embodiment, a pump 210 may be positioned in the LNG fluidic coupling 226 to control a flow (e.g., flow rate) of LNG to the vaporizer 234 and/or in the CNG fluidic coupling 216 to control a flow (e.g., flow rate) of CNG to the first locomotive 100.

The CNG fluidic coupling 114 further includes a detachable interface coupling 236 that enables the fuel tender 110 to be decoupled from the locomotive 100. It will also be appreciated that in other embodiments the pass-through control valve 156 may be located on board the fuel tender 110, along with suitable fluidic couplings to pass through fluidic coupling 160.

As shown in FIG. 2, components on the fuel tender 110 are powered with electrical energy from the first locomotive 100. Specifically, the electrical bus 128 is coupled to an electrical bus 228 at a detachable interface coupling 214. The detachable interface coupling 214 enables the fuel tender 110 to be decoupled from the first locomotive 100. The electrical bus 128 and the electrical bus 228 may be referred to herein as electrical energy lines. In one embodiment, the rail vehicle may include one or more electrical energy lines traversing a space between the first locomotive 100 and the fuel tender 110. In other embodiments, components on the fuel tender 110 may be powered alternatively or additionally with an auxiliary power unit and/or batteries on board the fuel tender 110. In yet other embodiments, components of the fuel tender 110 may be powered with electrical energy from an alternate or additional locomotive.

Electrical energy generated at the first locomotive 100 travels to the fuel tender 110 through the electrical bus 228. Components on board the fuel tender 110 receive electrical energy via the electrical bus 228. Such components may include, but are not limited to, the vaporizer 234, tender controller 220, control valves 230, 232, LNG tank pressure sensor 260, LNG tank temperature sensor 264, cryogenic unit 268, flow meters, ambient air temperature sensors, compressors, blowers, radiators, batteries, lights, on-board monitoring systems, displays, climate controls (not shown), and the like.

The tender controller 220 on board the fuel tender 110 controls and/or actuates various components on board the fuel tender 110, such as the vaporizer 234, cryogenic unit 268, control valves (e.g., valve 230 and valve 232), one or more pumps 210, and/or other components on board the fuel tender 110, by sending commands to such components. The commands sent by the tender controller 220 may be based on commands sent to the tender controller 220 from the first locomotive controller 136 on board the first locomotive 100. For example, the first locomotive controller 136 may send a request to the tender controller 220 to stop vaporizing LNG and thereby stopping the conversion of LNG to CNG. In response, the tender controller 220 may actuate the vaporizer 234 to turn off or stop vaporizing LNG. In some examples, the tender controller 220 may also send commands and/or requests to the locomotive controller 136. For example, as discussed further below, if a vapor space pressure (e.g., pressure in the LNG storage tank 212) is above a threshold pressure, the tender controller 220 may send a request to the locomotive controller 136 to initiate a fuel routine to reduce CNG supply pressure and subsequently the vapor space pressure.

The tender controller 220 may also monitor fuel tender operating parameters. Such parameters may include, but are not limited to, pressure and temperature of the LNG storage tank 212, a level or volume of the LNG storage tank 212, pressure and temperature of the vaporizer 234, ambient air temperature, and the like. In one example, the tender controller 220 may send a LNG storage tank 212 pressure or CNG supply pressure measured at the LNG storage tank 212 or within the CNG supply lines to the first locomotive controller 136 on board the first locomotive 100.

It will be appreciated that the fuel tender 110 is not limited to the components shown in the example of FIG. 2 and described above. In other examples, the fuel tender 110 may include additional or alternative components. As an example, the fuel tender 110 may further include one or more additional sensors, flow meters, control valves, or the like.

The systems of FIGS. 1-2 provide for a system of mechanically coupled rail vehicles, comprising a rail vehicle having a multi-fuel engine, a fuel tender configured to fluidly and mechanically couple to the rail vehicle, the fuel tender including a vaporizer and a fuel container containing liquefied natural gas, and a controller on board the rail vehicle, the controller configured to send a request to the fuel tender to reduce converting liquid natural gas to gaseous natural gas, the request sent in response to a fuel storage request. In one example, the reducing may include gradually ramping down the conversion of liquid natural gas to gaseous natural gas until the vaporizer stops converting liquid natural gas to gaseous natural gas. The request further includes sending remaining gaseous natural gas to the multi-fuel engine of the rail vehicle for consumption. The controller is further configured to allow gaseous natural gas at a pressure lower than a threshold pressure to be consumed by the multi-fuel engine. Further, the controller is configured to decrease a manifold pressure of the multi-fuel engine of the rail vehicle in order to optimize consumption of the gaseous natural gas at the pressure lower than the threshold pressure in response to the fuel storage request.

As discussed above, LNG may be stored in a fuel container, such as the LNG storage tank 212 shown in FIG. 2. In one example, the LNG storage tank is on a fuel tender coupled to a rail vehicle. The rail vehicle includes a controller and a multi fuel engine. In one example, as shown at FIGS. 1-2, the fuel tender is the fuel tender 110, the rail vehicle is the first locomotive 100, the multi fuel engine is the primary engine 118, and the engine controller is the first locomotive controller 136. Further, as shown in FIG. 1, the rail vehicle and the fuel tender may be part of a consist including one or more additional rail vehicles and/or fuel tenders.

When LNG is stored in an unrefrigerated tank, the LNG tank gradually heats up due to the tank insulation not being 100% efficient. Even with efficient insulation and cryogenic refrigeration equipment, heat may leak into the LNG storage tank. As discussed above, the LNG tank includes a first portion filled with LNG and a remaining, second portion containing CNG. The CNG in the LNG tank vapor space may cause the pressure in the LNG tank to increase, for example if a temperature of the LNG tank increases. Over time the LNG tank pressure builds to a safety relief pressure threshold, thereby causing a pressure relief valve of the LNG tank to open. Opening of the pressure relief valve vents the LNG tank and reduces the LNG tank pressure. However, venting the LNG tank may waste fuel while also presenting a safety risk, including adding pollutants to the environment. Further, each opening of the safety relief valve may cause the relief valve to open at a slightly lower pressure due to mechanical features of the valve at each subsequent opening.

Instead of relying on a passive pressure relief valve to reduce LNG tank pressure, an alternate, active method of reducing LNG tank pressure, according to an embodiment of the invention, may reduce venting while also maximizing the effective fuel efficiency of LNG powered rail vehicles. In one example, the alternate method of reducing LNG tank pressure may include executing a fuel storage routine wherein the vapor (e.g., CNG) in the vapor space of the fuel tender and rail vehicle fluidic couplings (e.g., fuel lines) is reduced and consumed by the engine of the rail vehicle. Specifically, the fuel storage routine may include reducing and eventually stopping the conversion of LNG to CNG and sending any remaining CNG in the vapor space and/or fuel lines of the natural gas fuel system to the rail vehicle engine for consumption.

In one example, reducing the conversion of LNG to CNG may include gradually ramping down the conversion of LNG to CNG until the vaporizer eventually stops operating. At the same time, the supply of LNG from the LNG tank and to the vaporizer may be gradually reduced until no more LNG is supplied from the LNG tank. In another example, reducing the conversion of LNG to CNG may include stopping sending LNG to a vaporizer of the fuel tender and/or inactivating the vaporizer. By using the remaining vapor in the CNG fuel lines and LNG storage tank, the pressure and heat load in the LNG storage tank may be reduced. As a result, fuel efficiency may increase and the number of pressure relief valve opening events may decrease.

As the vapor space pressure and pressure of the CNG in the CNG supply lines decreases, the pressure of the CNG received at the locomotive engine may also decrease. During vehicle operation, in some embodiments, only CNG at a pressure greater than a threshold supply pressure may be accepted and consumed by the locomotive engine. For example, fuel supply valves such as CNG supply valve 156 or additional valves not shown in FIG. 2 may be set to only allow CNG over the threshold pressure to pass through the valves and to the engine. However, during the fuel storage routine, the controller may adjust one or more valves (e.g., CNG supply valves or valve 156 shown in FIG. 2) to allow CNG at a pressure lower than the threshold supply pressure to flow to the locomotive engine and be subsequently consumed.

The fuel storage routine may further include reducing a manifold pressure (MAP) of the engine of the rail vehicle. Reducing the MAP may enable the pressure in the natural gas fuel system fuel lines and LNG storage tank to decrease further while still transferring CNG to the rail vehicle engine (e.g., locomotive engine). Specifically, reducing the MAP may optimize the use of the lower pressure CNG (e.g., CNG at a pressure lower than the threshold supply pressure) at the rail vehicle engine.

In one example, the MAP may be reduced by decreasing a speed of the rail vehicle engine, or lowering a notch setting of the rail vehicle (or more generally, lowering a throttle setting of a vehicle). As a result, a horsepower of the rail vehicle may decrease, thereby decreasing MAP. The lowering of the notch setting or engine speed may be performed automatically by the locomotive controller as part of the fuel storage routine or performed manually by a rail vehicle operator. In one example, the notch lowering may be sequenced through the consist so that all LNG powered locomotives in the consist do not lower the notch setting at the same time. For example, a first LNG powered locomotive may reduce a notch setting, thereby allowing the first LNG powered locomotive to receive CNG at a lower pressure. At the same time, the notch setting of a second LNG powered locomotive in the same consist may maintain or increase a notch setting in order to maintain a designated vehicle speed. In another example, the MAP may be reduced by adjusting a waste gate and/or compressor recirculation valve.

The fuel storage routine may be executed during times when CNG may not be needed by the engine of a rail vehicle. For example, when the rail vehicle is coming to an end of its route (e.g., stopping) or enters an idle mode for a prolonged period of time, CNG may not be required to power the engine. Under conditions wherein CNG may not be needed for a period of time, the fuel storage routine may be initiated either automatically in response to rail vehicle operating conditions and/or manually by the rail vehicle operator.

In one example, the fuel storage routine may be triggered in response to a global positioning system (GPS) of the rail vehicle indicating that the rail vehicle is within a threshold distance of a stopping location. For example, the rail vehicle may be traveling in an area with geofence location markers. The location markers may indicate automatically to the locomotive controller a position of the rail vehicle with respect to the stopping location. In another example, the fuel storage routine may be triggered manually by the rail vehicle operator. For example, the rail vehicle may manually activate a control which activates the fuel storage routine, including reducing the rail vehicle speed and stopping the conversion of LNG to CNG.

In yet another example, the fuel storage routine may be triggered by an energy management system of the rail vehicle. The energy management system may be included in the locomotive/rail vehicle controller of the rail vehicle. Specifically, the energy management system may trigger the fuel storage routine based on a distance of the rail vehicle from a stopping location, a speed of the rail vehicle, an amount of CNG in the fuel lines of the fuel tender and rail vehicle, a pressure of the CNG in the vapor space and fuel supply lines, and the MAP of the engine of the rail vehicle. For example, the energy management system may determine when is the optimal time in the rail vehicle's route to decrease engine speed, lower the notch setting, and/or adjust another operating parameter (such as adjusting a waste gate) in order to lower MAP and begin consuming the remaining CNG. In some examples, the controller may not adjust MAP if a certain MAP is required to maintain vehicle operating conditions. In this case, the rail vehicle engine may consume as much of the CNG as possible given other rail vehicle constraints (e.g., such as a demanded MAP for vehicle power requirements).

In another example, the fuel storage routine may be triggered by the rail vehicle or the fuel tender responsive to CNG vapor space pressures (e.g., pressure of the CNG in the LNG tank). For example, if the CNG vapor space pressure is greater than a first threshold pressure, the fuel storage routine may be triggered in order to reduce the vapor space pressure. In this example, the first threshold pressure may be a pressure above a standard pressure of the LNG tank. The first threshold pressure may indicate the vapor space pressure approaching a threshold pressure that may result in opening of the LNG tank pressure relief valve. In response to the CNG vapor space pressure increasing above the first threshold pressure, the fuel routine may be executed to lower CNG vapor space pressure as much as possible without degrading engine performance. In another example, the fuel routine may be executed responsive to the CNG vapor space pressure increasing to or above a second threshold pressure, the second threshold pressure being greater than the first threshold pressure. In this example, the fuel routine may be executed in order to reduce the vapor space pressure below the second or first threshold pressure as quickly as possible. As a result, engine performance may be reduced in order to effectively reduce the vapor space pressure and reduce the likelihood of the pressure relief valve opening.

In this way, a method for operating a rail vehicle system may include sending from a controller of a rail vehicle a request to a fuel tender to reduce a pressure of gaseous natural gas on the fuel tender. As described above, the fuel tender may be coupled to the rail vehicle. In one example, reducing the pressure of gaseous natural gas on the fuel tender may include reducing a rate of converting liquid natural gas to gaseous natural gas. The request to reduce the pressure of gaseous natural gas may be sent in response to a fuel storage request. Additionally, a manifold pressure of an engine of the rail vehicle may be reduced based on the fuel storage request, the reduced pressure of the gaseous natural gas and additional vehicle operating conditions. Decreasing the manifold pressure of the engine may include decreasing engine speed or decreasing a notch setting of the rail vehicle.

In one example, the fuel storage request may be generated in response to a request from an operator of the rail vehicle. In another example, the fuel storage request may be generated in response to global positioning system coordinates indicating the rail vehicle is within a threshold distance of a stopping location. In yet another example, the fuel storage request may be generated in response to a request from an energy management system, the request based on one or more of a distance from a stopping location, an amount of natural gas in fuel lines of the rail vehicle, a speed of the rail vehicle, and the manifold pressure. In yet other examples, the fuel storage request may be generated in response to a pressure within a liquid natural gas storage tank increasing above a threshold pressure, the threshold pressure based on a pressure triggering opening of a pressure relief valve.

Sending the request to the fuel tender to reduce converting liquid natural gas to gaseous natural gas includes sending a request to the fuel tender to stop converting liquid natural gas to gaseous natural gas with a vaporizer and/or stopping sending liquid natural gas to the vaporizer.

Turning now to FIG. 3, a method 300 is shown for initiating a fuel routine for a gaseous fuel system (e.g., a gaseous fuel system of a rail vehicle or other vehicle). Specifically, the method 300 shows reducing a pressure of gaseous fuel on the fuel tender in response to one or more vehicle operating conditions. Reducing the pressure of gaseous fuel may be part of a fuel storage routine to prepare the vehicle for a period of reduced fuel usage such as stopping or idling. In one example, the vehicle is rail vehicle with a multi-fuel engine. In this example, the gaseous fuel system may be a natural gas fuel system wherein liquid natural gas (LNG) is stored in a fuel container (e.g., LNG storage tank 212 shown in FIG. 2) on a fuel tender, the fuel tender coupled to the rail vehicle. Thus, the fuel storage routine for the fuel tender may be triggered responsive to rail vehicle operating conditions such as pending idle periods wherein natural gas in not required to power the engine of the rail vehicle and/or fuel tender operating conditions such as a vapor space pressure of the LNG tank being above a threshold pressure. As such, the fuel storage routine may include decreasing a pressure and heat load of the LNG storage tank on the fuel tender (e.g., decreasing the vapor space pressure). In one example, instructions for executing the method 300 may be stored in a memory of the controller of a rail vehicle, such as the first locomotive controller 136 of the first locomotive 100 shown in FIG. 2. In alternate embodiments, the method 300 may be provided for a different type of vehicle with an alternate type of fuel or fuel system.

The method begins at 302 by determining operating conditions of the rail vehicle and fuel tender. Operating conditions of the rail vehicle and fuel tender include a speed of the rail vehicle, rail vehicle engine speed and load, an amount of CNG in the fuel lines (e.g., fuel supply lines) of the natural gas fuel system, an amount of CNG in the LNG storage tank, a pressure of the CNG in the fuel supply lines and the LNG storage tank (e.g., vapor space pressure), MAP of the rail vehicle engine, or the like.

At 304, the method includes determining if it is time to initiate the fuel routine. In one example, the fuel routine may include preparing the rail vehicle and fuel tender to store fuel (e.g., store the natural gas). In another example, the fuel routine may include decreasing a CNG vapor space pressure. As such, the fuel routine may include reducing the conversion of LNG to CNG to reduce the pressure of CNG in the vapor space and CNG supply lines. As discussed above, in one example, a rail vehicle operator may manually initiate the fuel routine. Manually initiating the fuel routine may include manually requesting a decrease in the conversion and supply of CNG and/or manually decreasing rail vehicle speed. In another example, the fuel routine may be initiated in response to the controller of the rail vehicle receiving global positioning coordinates indicating the rail vehicle is within a threshold distance of a determined location. In one example, the determined location may be a stopping location or an end of a route of the rail vehicle. In yet another example, the fuel routine may be initiated based on status information from an energy management system, global positioning system coordinates regarding a distance of the rail vehicle from the determined location, a pressure of CNG in the CNG vapor space and supply lines (e.g., such as the LNG fluidic coupling 226, CNG fluidic coupling 216, CNG fluidic coupling 114, and/or pass through fluidic coupling 160 shown in FIG. 2), a speed of the rail vehicle, and/or the MAP. For example, the energy management system may determine when is the optimal time in the rail vehicle's route to lower MAP and begin consuming the remaining CNG. In one example, if there is a larger amount of CNG remaining in the CNG fuel supply lines at a higher pressure the fuel storage routine may be initiated earlier than if there is a smaller amount of CNG remaining in the CNG fuel supply lines at a lower pressure. In another example, if the remaining route of the rail vehicle includes a down-grade, the fuel routine may be executed sooner than if there were no down-grade in the route.

In another embodiment, the fuel routine may be initiated responsive to a vapor space pressure (e.g., pressure of CNG in the LNG tank) greater than a threshold vapor space pressure. As discussed above, when the vapor space pressure reaches a threshold pressure relief pressure, a pressure relief valve of the LNG tank opens. In order to reduce the amount of pressure relief valve events, the fuel routine may be executed to lower the vapor space pressure of the tank when the vapor space pressure approaches the threshold pressure relief pressure. In a first example, when the vapor space pressure of the LNG tank is greater than a first threshold pressure, the fuel routine may be initiated. In a second example, when the vapor space pressure of the LNG tank is greater than a second threshold pressure, the second threshold pressure being greater than the first threshold pressure, the fuel routine may be initiated. In this example, a response time for executing the fuel routine and performing the subsequent steps of the routine (as described below) may be reduced. As such, the vapor space pressure may decrease at a faster rate with decreasing vapor space pressure taking higher priority over engine performance (e.g., MAP may be decreased even if it is requested at a higher rate, as discussed further below).

In one example, the fuel routine is initiated by the rail vehicle (e.g., locomotive controller) in response to one or more of the triggers discussed above. In another example, the fuel routine is initiated by the fuel tender (e.g., tender controller) in response to vapor space pressure or one or the other triggers discussed above.

Returning to 304, if the fuel routine has not been triggered indicating that it is not time to begin storing fuel, the method continues on to 306 to maintain vehicle operating conditions. However, if the fuel routine is initiated at 304, the method continues on the 308 to send a request to the fuel tender to initiate the fuel routine. Specifically, the controller of the rail vehicle (e.g., locomotive controller) may send a fuel request to the controller of the fuel tender (e.g., tender controller) to initiate the fuel routine. At 310, the method includes determining if the tender controller accepts the fuel routine request. If the fuel tender does not accept the fuel routine request, the method continues on to 312 to not initiate the fuel routine and maintain the rail vehicle and fuel tender operating conditions. In one example, the fuel tender may not accept the fuel routine request if the vapor space pressure is below the first threshold pressure or a standard operating pressure of the LNG tank.

However, if the fuel tender accepts the fuel routine request, the method continues on to 314 to accept CNG at a pressure lower than a threshold supply pressure. Specifically, the method at 314 includes adjusting one or more valves or engine operating conditions in order to allow the rail vehicle engine to accept and consume the supplied CNG, even if the CNG is at a pressure lower than a threshold supply pressure. For example, a method 500 for accepting and consuming CNG at an engine of the rail vehicle, the CNG sent to the rail vehicle from a fuel tender, is shown at FIG. 5 and described further below. In method 500, if the CNG supplied to the rail vehicle engine is below the threshold supply pressure, the CNG will not be accepted and consumed by the engine unless the locomotive controller is currently running the fuel routine. As such, CNG below the threshold supply pressure may only be consumed by the rail vehicle engine if the fuel routine has been initiated.

Returning to FIG. 3, at 316 the method includes adjusting one or more engine or rail vehicle operating parameters to optimize the use of the CNG at a lower supply pressure. As discussed above, one or more rail vehicle operating conditions may be adjusted in order to reduce MAP so that as much CNG as possible is consumed by the rail vehicle engine, thereby allowing further reduction of vapor space pressure and CNG supply pressure. The one or more rail vehicle operating conditions may include an engine speed, a notch setting (e.g., horsepower setting) of the rail vehicle, a position of waste gate, and/or a position of a compressor recirculation valve. For example, reducing engine speed, reducing the notching setting, increasing the opening of the wastegate, and/or increasing the opening of the compressor recirculation valve may reduce MAP. As a result, the rail vehicle engine may consume more CNG at a lower supply pressure. Lowering the MAP may, in turn, result in a lower residual pressure of the CNG on the fuel tender.

In one example, lowering the MAP at 316 may include only lowering the MAP based on engine operating conditions. For example, the MAP may be lowered only as much as is allowed based on torque demand and power requirements of the rail vehicle. Specially, MAP may be reduced as long as engine or rail vehicle performance is not reduced. In another example, if the need to lower vapor space pressure is more severe (e.g., the vapor space pressure is greater than the second threshold pressure as described above), MAP may be lowered to consume as much CNG as possible, despite degradation of rail vehicle performance. Said another way, degradation of rail vehicle performance may be allowed if reduced MAP is required to reduce vapor space pressure below the second threshold pressure.

At 318, the method includes gradually decreasing CNG supply pressure to the rail vehicle (e.g., the pressure of the CNG supplied to the engine of the rail vehicle). Specifically, the controller of the rail vehicle (e.g., locomotive controller) may send a fuel request to the controller of the fuel tender (e.g., tender controller) to reduce the CNG supply pressure and reduce the conversion of LNG to CNG. In one example, the method at 318 includes gradually decreasing a supply of LNG from the LNG tank and to the vaporizer. In another example, the method at 318 includes gradually reducing the rate of converting LNG to CNG. The rate of converting may be reduced to a rate of substantially zero such that the vaporizer is inactivated. In some examples, the request sent to the fuel tender may include a request to stop converting LNG to CNG by one or both of stopping sending LNG to the vaporizer and inactivating the vaporizer. In response to the request, the tender controller may adjust one or more valves in the LNG and CNG supply lines (e.g., fluid conduits) and/or a pump speed of one or more fuel pumps (e.g., such as fuel pump 210 shown in FIG. 2). For example, the tender controller may close a valve, such as valve 230, to stop sending LNG to the vaporizer. After stopping sending LNG to the vaporizer and/or inactivating the vaporizer, the method at 318 may include sending any remaining CNG in the CNG fuel lines (e.g., supply lines) to the rail vehicle for consumption.

At 320, the method includes determining if the rail vehicle or the fuel tender has requested to exit the fuel routine. For example, the rail vehicle operator may manually request an increase in MAP and/or rail vehicle power output. In one example, the rail vehicle operator may manually request the increase in rail vehicle power if the rail vehicle cannot stop at the originally determined location. In another example, if there is an error in the global positioning system such that a stopping location of the rail vehicle changes before reaching the originally designated stopping location, the rail vehicle may need to increase power to continue operating and traveling to the updated destination. If there is no request to exit the fuel routine, the method continues on to 322 to continue executing the fuel routine.

Alternatively, if there is a request to exit the fuel routine, the method continues on to 324 to increase the power output of the rail vehicle and send a request to the fuel tender to increase the CNG supply pressure to the threshold supply pressure. For example, the request may include a request to restart the vaporizer and start sending LNG to the vaporizer.

As introduced above with regard to FIG. 3, FIG. 5 shows a method 500 for accepting and consuming CNG at an engine of the rail vehicle, the CNG sent to the rail vehicle from a fuel tender. At 502, the method includes determining vehicle operating conditions. In one example vehicle operating conditions may include vapor space pressure of an LNG storage tank, pressure of the CNG supplied to and received at the rail vehicle, MAP, engine speed and load, or the like. At 504, the method includes determining if the rail vehicle requires CNG. For example, based on engine load and additional operating conditions of the rail vehicle, the controller on the rail vehicle (e.g., locomotive controller) may request CNG from a fuel tender coupled to the rail vehicle. If the rail vehicle does not require CNG, the method continues on to 506 to maintain rail vehicle operating conditions. Alternatively, if the rail vehicle does require CNG, the method continues on to 508 to send a request to the fuel tender to deliver CNG to the rail vehicle.

At 510, the method includes determining if the pressure of the CNG received at the rail vehicle is less than a threshold supply pressure. In one example, the threshold supply pressure may be 827 kPa. In another example, the threshold supply pressure may be larger or smaller than 827 kPa. Under standard operating conditions, CNG may be maintained at or above the threshold supply pressure. If the CNG pressure is not below the threshold supply pressure, the method continues on to 512 to accept the CNG at the locomotive engine and subsequently consume the supplied CNG. However, if the pressure of the CNG is less than the threshold supply pressure, the method continues on to 514 to determine if the locomotive controller is currently running (e.g., executing) the fuel routine. For example, when the fuel routine is initiated and accepted at 308 and 310 in method 300 (as shown in FIG. 3), the locomotive controller may apply a flag that indicates the fuel routine is running. As a result, engine operating conditions such as pressure settings of one or more CNG supply valves may be adjusted.

If the rail vehicle is not currently running the fuel routine, the method continues on to 516 to not accept the CNG at the lower than the threshold supply pressure. Further, the rail vehicle engine may use alternate fuel to power the engine while waiting for the CNG supply pressure to increase. Alternatively, if the rail vehicle is running the fuel routine at 514, the method continues on to 518 to accept the supplied CNG at a pressure lower than the threshold supply pressure. The rail vehicle engine may then consume the CNG at the lower pressure. In this way, during the fuel routine, the rail vehicle engine may consume CNG at a lower pressure than the threshold supply pressure. As a result, the pressure of the CNG in the CNG supply lines and the vapor space pressure may be further reduced.

FIG. 4 is a graph 400 showing example adjustments to CNG supply pressure (e.g., gaseous fuel supply pressure) responsive to initiation of a fuel routine for an example gaseous fuel system, such as the natural gas system described above. Specifically, graph 400 shows changes in a distance from a stopping location of a rail vehicle at plot 402, changes in rail vehicle horsepower (HP) at plot 404, changes in a pressure of the CNG being sent to the engine (e.g., CNG supply pressure) at plot 406, changes in MAP at plot 408, changes in fuel flow (e.g., rate of fuel flow) to a vaporizer at plot 410, changes in vaporizer operation at plot 412, and changes in LNG storage tank pressure (e.g., vapor space pressure) at plot 414. As discussed above, a fuel storage routine for a natural gas system of a fuel tender coupled to a rail vehicle may be initiated in response to the rail vehicle being within a threshold distance of a stopping location. In alternate examples, the fuel storage routine may be initiated responsive to alternate or additional vehicle operating conditions such as when the LNG storage tank pressure increases above a threshold pressure. Further, the vaporizer on the fuel tender may be turned on or off to start or stop the vaporization of LNG to CNG. In other examples, vaporizer operation (and subsequently the rate of converting LNG to CNG) may be increased or decreased by adjusting operation between fully on or fully off.

Prior to time t1, the rail vehicle is farther from a designated stopping location than a threshold distance T1 (plot 402). Additionally, the vaporizer on board the fuel tender is on and LNG is flowing to the vaporizer (plots 412 and 410). As a result, LNG is being converted to CNG. The CNG may then be sent to the engine of the rail vehicle to at least partially power the rail vehicle. The CNG being supplied to the engine is at a threshold pressure T2 (plot 406) which is above the MAP (plot 408). Before time t1 the LNG storage tank pressure increases due to heating in the tank (plot 414). Just before time t1, the LNG storage tank pressure is approaching a threshold pressure relief pressure, P1. At the threshold pressure relief pressure a pressure relief valve of the LNG storage tank may open.

At time t1, the rail vehicle is within the threshold distance T1 of the designated stopping location (plot 402). In one example, the distance information may be received at the rail vehicle controller from a global positioning system of the rail vehicle. In response to the rail vehicle being within the threshold distance T1 of the stopping location, the rail vehicle controller may send a request to the tender controller to reduce the supply pressure of CNG by reducing the conversion of LNG to CNG. As a result, the LNG fuel flow to the vaporizer may gradually decrease to zero between time t1 and time t2. At time t2, the vaporizer is turned off. As shown in FIG. 4, the vaporizer continues operating between time t1 and time t2 in order to vaporize any remaining LNG sent to the vaporizer. In alternate embodiments, the vaporizer may be turned off at time t1.

Also at time t2, the horsepower (HP) of the rail vehicle decreases (plot 404), thereby decreasing the MAP (plot 408). As fuel flow to the vaporizer decreases and the vaporizer is turned off and more CNG is consumed by the engine, the CNG supply pressure decreases (plot 406). At time t3, the distance from the determined stopping location increases above the threshold distance T1 (plot 402). In one example, the change in distance may be a result of an error in the global positioning system. In another example, the change in distance may be due to a change in the stopping location of the rail vehicle. In response to the distance from the stopping location increasing at time t3, a request to increase the CNG supply pressure may be generated. In response, the CNG supply pressure (plot 406) may be increased by increasing the LNG fuel flow to the vaporizer (plot 410) and then turning on the vaporizer (plot 412). As a result of resuming LNG fuel flow and vaporization of the LNG, the CNG supply pressure may increase until the pressure reaches the threshold pressure T2 (plot 406). In some embodiments, the controller of the rail vehicle may additionally or alternatively increase injection of an alternate fuel, such as diesel fuel, at time t3 in order to increase rail vehicle HP. In this way, any lags in supply of CNG to the engine may be compensated for with the supply of the alternate fuel. As such, rail vehicle HP may be maintained at a demanded level while the CNG fuel supply is restarted As shown at time t1 in FIG. 4, during a first condition where a rail vehicle is within a threshold distance of a stopping location, a controller of the rail vehicle may send from the controller of the rail vehicle a request to a fuel tender to reduce a CNG supply pressure. Reducing the CNG supply pressure may include gradually decreasing the conversion of LNG to CNG. During the reducing the CNG supply pressure, the controller may adjust one or more vehicle operating parameters in order to accept and consume CNG at the reduced CNG supply pressure. In one example, an engine speed or notch setting of the rail vehicle may decrease in order to reduce MAP such that the CNG at the reduced CNG supply pressure may be consumed by the engine. Thus, the engine may accept the CNG at a pressure lower than a threshold pressure (e.g., threshold supply pressure) during the first condition.

As shown at time t3, during a second condition, different than the first condition, the controller of the rail vehicle may send a request to the fuel tender to increase the CNG supply pressure to the threshold supply pressure, thereby requesting the fuel tender to resume converting liquid natural gas to gaseous natural gas. The second condition may include a request to increase the HP of the rail vehicle following a fuel storage request. The request to increase the HP of the rail vehicle may be in response to a change in the distance from a designated stopping location of the rail vehicle.

In this way, executing a fuel storage routine in response to pending engine idle and/or vehicle stopping conditions, or increased pressure in a liquid fuel storage tank (e.g., LNG vapor space pressure), may help to conserve fuel of the rail vehicle. Specifically, the fuel storage routine as described above may allow for a decrease in the pressure and heat load of a fuel container, such as an LNG storage tank of a fuel tender. By decreasing the pressure of the natural gas fuel system and the LNG storage tank, venting of the tank may be reduced. A reduction in venting events may both conserve fuel while also reducing an amount of contaminants released into the environment.

As one embodiment, a method comprises sending from a controller of a vehicle a fuel request to a fuel tender to reduce a pressure of gaseous fuel on the fuel tender and adjusting one or more vehicle operating parameters to allow consumption of the gaseous fuel at an engine of the vehicle when the pressure of the gaseous fuel is below a threshold supply pressure. The method further comprises responding to an operator of the vehicle to initiate the sending of the fuel request.

In one example, the method further comprises receiving global positioning system coordinates indicating the vehicle is within a threshold distance of a determined location and responding to the receiving of the coordinates to initiate the sending of the fuel request. In another example, the method further includes receiving status information from an energy management system, the status information based on global positioning system coordinates regarding a distance of the vehicle from a determined location, an amount of gaseous fuel in fuel lines of the vehicle, the pressure of the gaseous fuel on the fuel tender, a speed of the vehicle, and an intake manifold pressure; and responding to receiving the status information by initiating the sending the fuel request.

As described above, the pressure of gaseous fuel on the fuel tender includes one or more of a pressure of gaseous fuel in a liquid fuel tank and a pressure of gaseous fuel in gaseous fuel supply lines. In one example, the method further includes initiating the sending the fuel request in response to the pressure of the gaseous fuel in the liquid fuel tank being greater than a second threshold pressure, the second threshold pressure based on a pressure which results in opening of a pressure relief valve coupled to the liquid fuel tank.

Adjusting the one or more vehicle operating parameters includes adjusting one or more of an engine speed, a notch setting, a position of a waste gate, or a position of a compressor recirculation valve to decrease intake manifold pressure of the engine and allow consumption of the gaseous fuel below the threshold supply pressure. In another example, the adjusting one more vehicle operating parameters includes adjusting pressure settings of one or more valves to allow passage of the gaseous fuel below the threshold supply pressure from the fuel tender to the engine.

The gaseous fuel comprises gaseous natural gas and the method further comprises sending a signal from the vehicle to the fuel tender to decrease the pressure of the gaseous fuel on the fuel tender and, responsive to the signal, reducing a rate of converting liquid natural gas to gaseous natural gas by one or both of reducing the sending liquid natural gas to a vaporizer on board the fuel tender or reducing vaporization at the vaporizer.

As another embodiment, a control system for a vehicle comprises a controller operable to initiate a fuel routine for a gaseous fuel system and to request a reduction in a supply pressure of gaseous fuel of the gaseous fuel system via one or more of a reduction in a rate of vaporization of liquid fuel remote from the vehicle or a reduction in a supply of the vaporized fuel to the vehicle. The controller is further operable to adjust one or more engine operating parameters in order to accept the gaseous fuel at a pressure lower than a threshold pressure, the one or more engine operating conditions including a pressure setting of a gaseous fuel supply valve, an engine speed, a notch setting of the engine, a waste gate position, and a compressor bypass valve position.

As yet another embodiment, a vehicle system comprises a controller configured to be disposed on a vehicle and that is operable to send a fuel request from the vehicle to a fuel tender coupled to the vehicle to adjust a gaseous fuel supply pressure below a threshold supply pressure at least partially by decreasing a rate of conversion of liquid fuel to gaseous fuel and control a manifold pressure of an engine of the vehicle. The vehicle system further comprises a global positioning system in communication with the controller that is operable to provide vehicle coordinates to the controller, and wherein the controller is further operable to determine a distance between the vehicle coordinates and a determined location, and to respond to a the distance being less than a threshold distance value by initiating the fuel request.

The vehicle system further comprises a plurality of sensors operable to determine the manifold pressure and to determine the gaseous fuel supply pressure, the sensors being coupled to the controller, and wherein the controller is further operable to control the manifold pressure based on the gaseous fuel supply pressure. Additionally, the vehicle system comprises a vaporizer operable to convert the liquid fuel to the gaseous fuel and wherein the controller is further operable to control operating parameters of the vaporizer. The vaporizer comprises a pump, motor, and valve, and wherein the controller is operable to control at least one of the pump, motor, and valve. The controller is further operable to control a flow of thermal fluid from the vehicle to a vaporizer and thereby to control the rate of conversion of the liquid fuel to the gaseous fuel.

Additionally, the controller is coupled to an automatic engine start stop (AESS) device that is configured to shut down the engine when the engine is in idle, and prior to the AESS device shutting down the engine, the controller is operable to send the fuel request to decrease the rate of conversion of liquid fuel to gaseous fuel. The vehicle system is part of a consist of vehicles having at least the vehicle and a lead vehicle, the vehicle comprising a trail vehicle, and the controller is on the trail vehicle and is operable to initiate the AESS device at least one of more frequently, for a longer duration, or after a shorter idle period than if the trail vehicle was the lead vehicle. Said another way, the vehicle is a trail vehicle in a consist of vehicles, the consist of vehicles also including a lead vehicle. In some examples, additional vehicles may be positioned between the lead vehicle and the trail vehicle. In other embodiments, the vehicle may be the lead vehicle or positioned between a lead vehicle and a trail vehicle of the consist.

As another embodiment a method comprises operating a vehicle system by at least one of responding to a changing engine speed for an engine on a vehicle by controlling a pressure ratio between a first pressure of a gaseous fuel supply to the engine and a second pressure of an air intake manifold to the engine so that the first pressure is greater than the second pressure and the ratio is in a determined range of ratio values regardless of changes in the second pressure caused by the changing engine speed or responding to the first pressure changing by controlling the engine speed so that the ratio is in the determined range of ratio values. In one example, the determined range of ratio values is a pre-determined or designated range of ratio values for the engine. For example, the determined range of ratio values may be a range of ratio values pre-set in a controller of the vehicle system. Further, the vehicle system responds to the changing first pressure by controlling the engine speed so that the ratio is in the determined range of ratio values, the method further comprising maintaining the vehicle speed constant while the engine speed changes to maintain the ratio value.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   sending from a controller of a vehicle a fuel request to a fuel tender to reduce a pressure of gaseous fuel on the fuel tender, the fuel tender coupled to the vehicle; and
   adjusting one or more vehicle operating parameters on the vehicle to maintain an air intake manifold pressure of an engine of the vehicle below a supply pressure of the gaseous fuel and allow consumption of the gaseous fuel at the engine when the supply pressure of the gaseous fuel is below a threshold supply pressure.

2. The method of claim 1, further comprising one or more of responding to an operator of the vehicle to initiate the sending of the fuel request or receiving global positioning system coordinates indicating the vehicle is within a threshold distance of a determined location and responding to the receiving of the coordinates to initiate the sending of the fuel request.

3. The method of claim 1, further comprising receiving status information from an energy management system, the status information based on global positioning system coordinates regarding a distance of the vehicle from a determined location, an amount of gaseous fuel in fuel lines of the vehicle, the pressure of the gaseous fuel on the fuel tender, a speed of the vehicle, and an intake manifold pressure; and responding to receiving the status information by initiating the sending the fuel request.

4. The method of claim 1, wherein the pressure of the gaseous fuel on the fuel tender includes one or more of a pressure of gaseous fuel in a liquid fuel tank or a pressure of gaseous fuel in gaseous fuel supply lines and further comprising initiating the sending of the fuel request in response to the pressure of the gaseous fuel in the liquid fuel tank being greater than a second threshold pressure, the second threshold pressure based on a pressure which results in opening of a pressure relief valve coupled to the liquid fuel tank.

5. The method of claim 1, wherein the adjusting the one or more vehicle operating parameters includes adjusting one or more of an engine speed, a notch setting, a position of a waste gate, or a position of a compressor recirculation valve to decrease the air intake manifold pressure of the engine below the supply pressure of the gaseous fuel and allow consumption of the gaseous fuel below the threshold supply pressure.

6. The method of claim 1, wherein adjusting the one or more vehicle operating parameters includes adjusting pressure settings of one or more gaseous fuel supply valves to allow passage of the gaseous fuel below the threshold supply pressure from the fuel tender to the engine.

7. A control system for a vehicle, comprising:
   a controller operable to initiate a fuel routine for a gaseous fuel system and to request a reduction in a supply pressure of gaseous fuel of the gaseous fuel system via one or more of a reduction in a rate of vaporization of liquid fuel remote from the vehicle or a reduction in a supply of the vaporized fuel to an engine of the vehicle; and
   adjusting operation of an engine on board the vehicle in response to receiving at the engine the gaseous fuel at the reduced supply pressure.

8. The control system of claim 7, wherein the reduced supply pressure is lower than a threshold pressure and wherein adjusting operation of the engine includes adjusting one or more of a pressure setting of a gaseous fuel supply valve, an engine speed, a notch setting of the engine, a waste gate position, or a compressor bypass valve position in order to reduce an air intake manifold pressure of the engine below the supply pressure of gaseous fuel.

9. A vehicle system, comprising:
   a controller configured to be disposed on a vehicle and that is operable to:
      send a fuel request from the vehicle to a fuel tender coupled to the vehicle to adjust a gaseous fuel supply pressure below a threshold supply pressure at least partially by decreasing a rate of conversion of liquid fuel to gaseous fuel; and
      control an air intake manifold pressure of an engine of the vehicle based on the gaseous fuel supply pressure below the threshold supply pressure.

10. The vehicle system of claim 9, further comprising a global positioning system in communication with the controller that is operable to provide vehicle coordinates to the controller, and wherein the controller is further operable to determine a distance between the vehicle coordinates and a determined location, and to respond to the distance being less than a threshold distance value by initiating the fuel request.

11. The vehicle system of claim 9, further comprising a plurality of sensors operable to determine the air intake manifold pressure and to determine the gaseous fuel supply pressure, the plurality of sensors being coupled to the controller, and wherein the controller is further operable to control the air intake manifold pressure to be less than the gaseous fuel supply pressure.

12. The vehicle system of claim 9, further comprising a vaporizer operable to convert the liquid fuel to the gaseous fuel and wherein the controller is further operable to control operating parameters of the vaporizer, wherein the vaporizer comprises a pump, motor, and valve, and wherein the controller is operable to control at least one of the pump, motor, or valve, and wherein the controller is further operable to control a flow of thermal fluid from the vehicle to the vaporizer to control the rate of conversion of the liquid fuel to gaseous fuel.

13. The vehicle system of claim 9, wherein the controller is coupled to an automatic engine start stop (AESS) device configured to shut down the engine when the engine is in idle, and prior to the AESS device shutting down the engine, the controller is operable to send the fuel request to decrease the rate of conversion of liquid fuel to gaseous fuel.

14. The vehicle system of claim 13, wherein the system is part of a consist of vehicles having at least the vehicle and a lead vehicle, the vehicle comprising a trail vehicle of the consist, and the controller is on the trail vehicle and is operable to initiate the AESS device.

15. A method, comprising operating a vehicle system by at least one of:
   responding to a changing engine speed for an engine on a vehicle by controlling a pressure ratio between a first pressure of a gaseous fuel supply to the engine and a second pressure of an air intake manifold to the engine so that the first pressure is greater than the second pressure and the pressure ratio is in a determined range of ratio values regardless of changes in the second pressure caused by the changing engine speed; or
   responding to the first pressure changing by controlling the engine speed so that the pressure ratio is in the determined range of ratio values.

16. The method of claim 15, wherein the vehicle system responds to the changing first pressure by controlling the engine speed so that the pressure ratio is in the determined range of ratio values, the method further comprising maintaining the vehicle speed constant while the engine speed changes to maintain the ratio value.

17. The method of claim 15, further comprising decreasing engine speed in response to the first pressure decreasing below a threshold supply pressure during a fuel routine for decreasing a pressure of gaseous fuel on a fuel tender coupled to the vehicle, where the pressure of gaseous fuel on the fuel tender includes one or more of a pressure of gaseous fuel in a liquid fuel tank or a pressure of gaseous fuel in gaseous fuel supply lines.

18. The method of claim 17, further comprising initiating the fuel routine in response to one or more of the vehicle being within a threshold distance of a determined location based on global positioning system coordinates or the pressure of gaseous fuel in the liquid fuel tank being greater than a second threshold pressure, the second threshold pressure based on a pressure which results in opening of a pressure relief valve coupled to the liquid fuel tank.

19. The method of claim 17, wherein liquid fuel is converted to gaseous fuel at a vaporizer on the fuel tender and wherein the fuel routine includes decreasing the pressure of gaseous fuel on the fuel tender via one or more of reducing a rate of vaporization of liquid fuel at the vaporizer or reducing a supply of liquid fuel from the liquid fuel tank to the vaporizer.

20. The method of claim 17, further comprising adjusting pressure settings of one or more valves to allow passage of gaseous fuel below the threshold supply pressure from the fuel tender to the engine and further comprising adjusting one or more of an engine notch setting, a position of a waste gate, or a position of a compressor recirculation valve to maintain the second pressure lower than the first pressure.

21. The method of claim 15, further comprising not accepting gaseous fuel at the engine and operating the engine with an alternate fuel in response to the first pressure being below a threshold supply pressure when a fuel routine for decreasing a pressure of gaseous fuel on a fuel tender coupled to the vehicle has not been initiated.

* * * * *